(12) United States Patent
Bae

(10) Patent No.: US 11,677,834 B2
(45) Date of Patent: Jun. 13, 2023

(54) EXTENDED REALITY SYSTEM BASED ON MULTIMODAL INTERFACES

(71) Applicant: WHOBORN INC., Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 0 days.

(21) Appl. No.: 17/339,340

(22) Filed: Jun. 4, 2021

(65) Prior Publication Data
US 2021/0385298 A1 Dec. 9, 2021

(51) Int. Cl.
*H04L 67/131* (2022.01)
*G06F 3/01* (2006.01)
*A42B 3/28* (2006.01)
*G05D 23/19* (2006.01)

(52) U.S. Cl.
CPC ............ *H04L 67/131* (2022.05); *A42B 3/285* (2013.01); *G05D 23/1917* (2013.01); *G06F 3/011* (2013.01); *G06F 3/016* (2013.01)

(58) Field of Classification Search
None
See application file for complete search history.

(56) References Cited

U.S. PATENT DOCUMENTS

2017/0155885 A1* 6/2017 Selstad ............... H04N 13/341
2018/0095534 A1* 4/2018 Omote ................ G02B 27/017

* cited by examiner

*Primary Examiner* — Christopher J Kohlman

(57) ABSTRACT

According to an embodiment, there is provided an extended reality (XR) system based on multimodal interfaces including a computer configured to broadcast output data including at least one device identifier (ID), at least one time limit, and at least one reproduction data to at least one extended reality output device, and at least one extended reality output device configured to receive the output data and reproduces only reproduction data corresponding to itself within the time limit based on the at least one device identifier (ID). According to this, a user can experience reproduction of five senses with a sense of reality without interruption.

18 Claims, 20 Drawing Sheets

| I/O | Command (MSB First 1Byte) | | | | | | | | Devices Count (MSB First 1Byte) | Devices Count (LSB First 1Byte) | Command (LSB First 1Byte) | | | | | | | |
|---|---|---|---|---|---|---|---|---|---|---|---|---|---|---|---|---|---|---|
| | I/O | Sight | Hearing | Touch | Smell | Taste | Reserve | Cmd Flag | 0x00 ~ 0xFF (max 255) | 0x00 ~ 0xFF (max 255) | Cmd Flag | Reserve | Taste | Smell | Touch | Hearing | Sight | I/O |
| IN PUT | 1 | x | x | x | x | x | x | 1 | n | reverse n | 1 | x | x | x | x | x | x | x |
| | | x | x | x | x | x | x | 0 | n | reverse n | 0 | x | x | x | x | x | x | x |
| OUT PUT | 0 | x | x | x | x | x | x | 1 | n | reverse n | 1 | x | x | x | x | x | x | x |
| | | x | x | x | x | x | x | 0 | n | reverse n | 0 | x | x | x | x | x | x | x |

FIG. 4A

| 0~n Device ID (2Bytes) | 0~n Packet Size (4Bytes) | Packet (Packet Size) | 0~n Packet Size (4Bytes) | 0~n Device ID (2Bytes) |
|---|---|---|---|---|
| (R)SHTSTR(R) + 0x00 ~ 0xFF Device Number | 0x00000000 ~ 0xFFFFFFFF bytes | Transfer Data Packet | 0x00000000 ~ 0xFFFFFFFF bytes | (R)SHTSTR(R) + 0x00 ~ 0xFF Device Number |
| 0xXX00 ~ 0xXXFF | Command Size | Device Input Initialize Command Packet Data | Command Size | 0xXX00 ~ 0xXXFF |
| 0xXX00 ~ 0xXXFF | Data Size | Device Input Packet Data | Data Size | 0xXX00 ~ 0xXXFF |
| 0xXX00 ~ 0xXXFF | Command Size | Device Output Initialize Command Packet Data | Command Size | 0xXX00 ~ 0xXXFF |
| 0xXX00 ~ 0xXXFF | Data Size | Device Output Packet Data | Data Size | 0xXX00 ~ 0xXXFF |

FIG. 4B

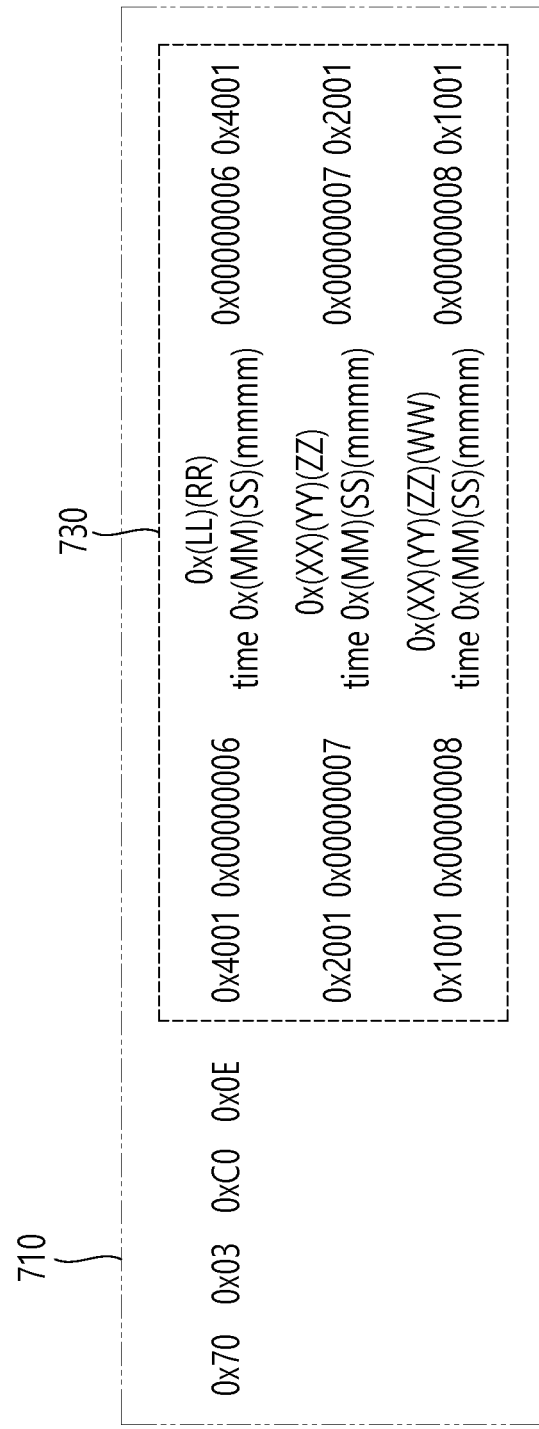

EXTENDED REALITY SYSTEM BASED ON MULTIMODAL INTERFACES

RELATED APPLICATION

This application claims benefit of priority to Korean Patent Application Serial Number 1020200068521, filed on Jun. 5, 2020, titled: EXTENDED REALITY SYSTEM BASED ON MULTIMODAL INTERFACES BASED ON ASYNCHRONOUS TRANSFER and Korean Patent Application Serial Number 1020200119884, filed on Sep. 17, 2020, titled: WEARABLE TEMPERATURE TRANSFER DEVICE CONSIDERING CONTENT AND AMBIENT TEMPERATURE, which are both incorporated herein by reference in their entirety for all purposes.

INFORMATION

Unless otherwise indicated herein, the approaches described in this section are not prior art to the claims in this application and are not admitted to be prior art by inclusion in this section.

Extended reality (XR) refers to a combination of all real and virtual environments generated by the computer technology and wearable devices, physical realities and is an umbrella concept that encompasses virtual reality (VR), augmented reality (AR), mixed reality (MR). With a growth of extended reality market, demand for a multimodal system that input and reproduce data about five senses of humans is increasing. In particular, the multimodal system can be effectively used in various virtual training systems such as medical fields such as surgical surgery, defense fields such as shooting training or pilot training, and educational fields such as driving or playing musical instruments.

The multimodal system needs a plurality of extended reality output devices such as a display device, headphone, and haptic device to deliver five senses of humans to a user. In order to reproduce five senses more realistically, contents such as video, audio, and haptics should be synchronized and reproduced in each extended reality output device.

As a technique for synchronizing reproduction data, in Korean Patent Laid-Open Publication No. 10-2019-0079613, audio content and haptic content are synchronized in such a way of inserting a time delay into an audio stream by calculating latency associated with transmission of the audio stream and including the time-to-play based on the calculated amount of latency in an audio packet. However, this technique has a problem in that it is complicated to calculate a time delay to be inserted when the number of output devices increases and an additional delay occurs accordingly.

Meanwhile, when providing content such as audio or video to the user, a method of processing the content itself, such as 3D audio mix, is used to increase the sense of reality and immersion.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative examples, embodiments, and features described above, further examples, embodiments, and features will become apparent by reference to the drawings and the following detailed description.

SUMMARY

The present disclosure provides an extended reality system in which a user can experience reproduction of five senses with a sense of reality without interruption, and a data transmission method therefor.

The present disclosure provides a temperature transfer device that can provide content so that a user can feel a sense of reality and immersion and improve wearability.

However, embodiments of the present disclosure are not limited thereto, and may be implemented in various ways without departing from the spirit and scope of the present disclosure.

In accordance with an embodiment of the present disclosure, an extended reality (XR) system based on multimodal interfaces comprises a computer configured to transmit output data including at least one device identifier (ID), at least one time limit, and at least one reproduction data to at least one extended reality output device and at least one extended reality output device configured to receive the output data and reproduce only reproduction data corresponding to itself within the time limit based on the at least one device identifier (ID).

According to one example, the computer may broadcast the output data to the at least one extended reality output device.

According to one example, the at least one extended reality output device may not reproduce the reproduction data corresponding to itself when the time limit has elapsed.

According to one example, the output data may further include a command flag, the command flag including information indicating whether or not to reproduce the reproduction data, and the at least one extended reality output device may reproduce the reproduction data corresponding to itself within the time limit based on the command flag.

According to one example, the output data may be configured in a NUI/NUX format for XR machine (NFXM) format having a mirror structure.

According to one example, the NFXM format may include a command, a device count, a device ID, a packet size, and a packet.

According to one example, the computer may broadcast the output data by selectively encrypting an entire area or a partial area of the NFXM format.

According to one example, the computer may encrypt the entire area and the partial area of the NFXM format and may access the encrypted entire area and the encrypted partial area using different keys.

According to one example, the reproduction data may include at least one reproduction data of sight, hearing, touch, smell, and taste.

According to one example, the extended reality output device may be any one of a head mounted display (HMD), a headphone, and a haptic device.

According to an example, the computer may synchronously transmit the output data based on at least one of the reproduction data and the command flag.

In accordance with another embodiment of the present disclosure, an extended reality (XR) system based on multimodal interfaces comprises a computer configured to transmit output data including at least one device identifier (ID), at least one time limit, and at least one reproduction data to at least one extended reality output device and at least one extended reality output device configured to receive the output data and reproduce only reproduction data corresponding to itself within the time limit based on the at least one device identifier (ID), in which the computer is located inside any one of the at least one extended reality output device.

In accordance with another embodiment of the present disclosure, a method of transmitting, by a computer, reproduction data to at least one extended reality (XR) output device comprises synchronizing an operation time between the computer and the at least one extended reality output device, and transmitting, by the computer, output data including at least one device identifier (ID), at least one time limit, and at least one reproduction data to at least one extended reality output device.

In accordance with another embodiment of the present disclosure, a method of receiving, by at least one extended reality (XR) output device, reproduction data from a computer comprises synchronizing an operation time between the computer and the at least one extended reality output device, receiving output data transmitted by the computer, the output data including at least one device identifier (ID), at least one time limit, and at least one reproduction data, and reproducing the reproduction data corresponding to itself within the time limit based on the at least one device identifier (ID).

In accordance with another embodiment of the present disclosure, a wearable temperature transfer device comprises a content output device configured to deliver content to a user, a wearing means configured to allow the user to wear the wearable temperature transfer device on his or her body, at least one temperature sensor configured to measure an ambient temperature of the wearable temperature transfer device, at least one thermoelectric element configured to transfer a temperature to the user, and a processor configured to determine the temperature to be transferred by the at least one thermoelectric element to the user in consideration of at least one of the content, the ambient temperature, and a temperature preset by the user.

According to one example, the ambient temperature may include an external temperature and a body temperature of the user, the external temperature including at least one of an air temperature and a room temperature and, the processor may modify the temperature determined in consideration of the content based on the ambient temperature.

According to one example, the at least one temperature sensor may be attached to an inner surface and an outer surface of the wearable temperature transfer device to measure the ambient temperature, the inner surface being a surface that contacts the user' body when the user wears the wearable temperature transfer device, and the outer surface being a surface that does not contact the user's body when the user wears the wearable temperature transfer device.

According to one example, the processor may estimate a temperature of a portion of the inner surface and the outer surface to which the at least one temperature sensor is not attached using the temperature measured by the at least one temperature sensor.

According to one example, the at least one thermoelectric element may heat the user by an exothermic reaction or cool the user by an endothermic reaction.

According to an example, when the content is audio, the processor may determine the temperature to be transferred to the user based on at least one of a frequency, a tempo, and a beat of the audio.

According to one example, when the content is an extended reality simulation, the processor may determine the temperature to be transferred to the user based on a relative position of an object included in the extended reality simulation and the user.

The foregoing summary is illustrative only and not intended to be in any way limiting. In addition to the illustrative examples, embodiments, and features described above, further examples, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIGS. 4A and 4B are diagrams illustrating a protocol format for a multimodal communication interface according to embodiments of the present disclosure;

FIG. 7 is a diagram illustrating a data encryption method in a protocol format for the multimodal communication interface according to embodiments of the present disclosure;

DETAILED DESCRIPTION

Figure 1:
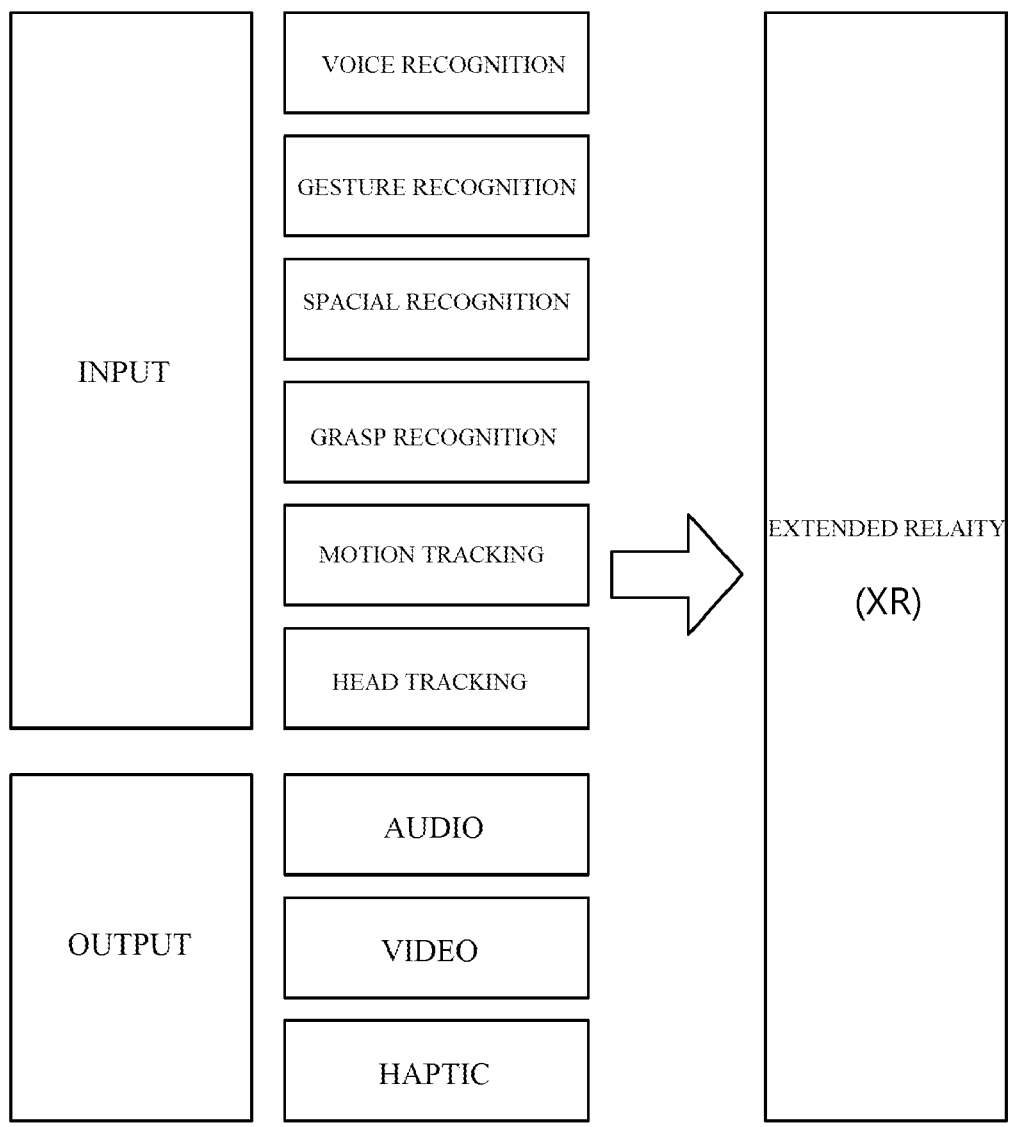
FIG. 1 is a diagram schematically illustrating an NFXM for an extended reality system according to embodiments of the present disclosure.

The present disclosure can be modified in various ways and may include various embodiments, and thus specific embodiments of the present disclosure will be described in detail with reference to the drawings.

However, this is not intended to limit the present disclosure to the specific embodiments and should be understood to cover all changes, equivalents, and substitutes included within the spirit and technical scope of the present disclosure.

Terms such as first and second may be used to describe various components, but the components are not limited by the terms. The above terms are used only for the purpose of distinguishing one component from other components. For example, without departing from the scope of right of the present disclosure, a first component may be named as a second component, and similarly, the second component may be named as the first component.

When a certain component is referred to as being "coupled" or "connected" to another component, it should be understood that the component may be directly coupled or connected to the other component, but other components may exist in the middle. On the other hand, when a certain component is referred to as being "directly coupled" or "directly connected" to another component, it should be understood that there is no other component in the middle.

The terms used in the present application are only used to describe specific embodiments and are not intended to limit the present disclosure. A singular expression includes a plural expression unless it is explicitly meant differently in the context. In the present application, it is to be understood that terms such as "include" or "have" are intended to designate the existence of features, numbers, steps, actions, components, parts, or combinations thereof described in the specification and do not preclude the possibility of the presence or addition of one or more other features or numbers, steps, actions, components, parts, or combinations thereof.

Unless otherwise defined, all terms used herein including technical or scientific terms have the same meaning as generally understood by a person having ordinary skill in the art to which the present disclosure pertains. Terms such as those defined in a generally used dictionary, should be interpreted as having a meaning consistent with the meaning in the context of the related technology, and are not to be interpreted as an ideal or excessively formal meaning unless explicitly defined in the present application.

Hereinafter, with reference to the accompanying drawings, preferred embodiments of the present disclosure will be described clearly and in detail so that those of ordinary skill in the art to which the present disclosure pertains can easily implement the present disclosure.

Hereinafter, specific embodiments will be described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

In the figures, the dimensions of layers and regions are exaggerated for clarity of illustration. Like reference numerals refer to like elements throughout. It will also be understood that when a layer, a film, a region, or a plate is referred to as being cony another one, it can be directly on the other one, or one or more intervening layers, films, regions, or plates may also be present. Further, it will be understood that when a layer, a film, a region, or a plate is referred to as being 'under' another one, it can be directly under the other one, and one or more intervening layers, films, regions, or plates may also be present. In addition, it will also be understood that when a layer, a film, a region, or a plate is referred to as being 'between' two layers, films, regions, or plates, it can be the only layer, film, region, or plate between the two layers, films, regions or plates, or one or more intervening layers, films, regions or plates may also be present.

FIG. 1 is a diagram schematically illustrating an NUI/NUX format for XR Machine (NFXM) for an extended reality (XR) system according to embodiments of the present disclosure.

Referring to FIG. 1, NFXM processes input data about five senses of humans through voice recognition, gesture recognition, space recognition, grasp recognition, motion tracking, head tracking, etc. and provides extended reality to a user by reproducing the five senses of humans through audio, video, and haptics.

For example, collection of user's behavior data through NFXM can be performed in the following way. Voice recognition can be processed using a voice analysis algorithm of user's voice data input through a microphone, and gesture recognition may be processed using a gesture algorithm of movement of a user input through a camera. Spatial recognition can be analyzed and processed using the camera and a spatial algorithm, and grasp recognition can be analyzed and processed using a micro electro mechanical system (MEMS) and a grasp algorithm. In motion tracking, data collected through a gyro sensor can be analyzed and tracked through a motion tracking algorithm, and in head tracking, data about movement of the user's head received through the gyro sensor and compass sensor can be processed using a head tracking algorithm.

In addition, for example, reproduction of the five senses through NFXM can be performed in the following way. Hearing reproduction through audio can provide three-dimensional and spatial sound through a binaural effect output through dual speakers, and sight reproduction through a screen can provide a screen in which a sense of presence and a sense of reality can be felt through a head mounted display (HMD) and extended reality technology. Touch can provide a user with a tactile sense according to the physical properties, shape, and size of an object through descriptions of physical force, vibration, pressure, etc. through a haptic device, and an object haptic algorithm.

Figure 2:
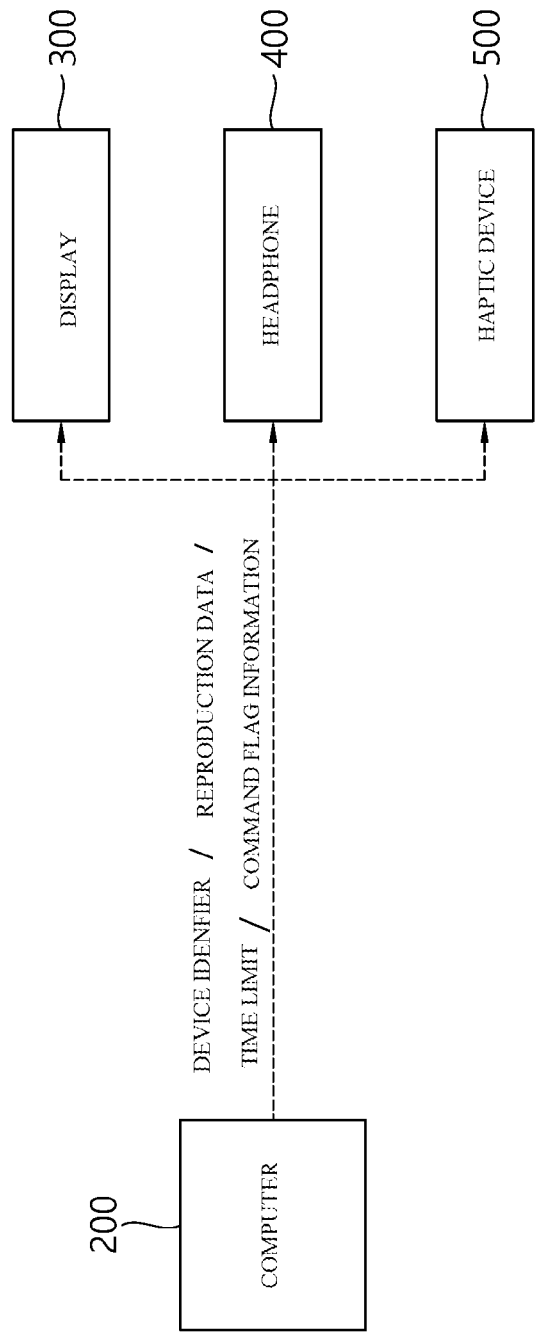
FIG. 2 is a diagram schematically illustrating an extended reality system based on multimodal interfaces and a data transmission method according to an embodiment of the present disclosure.

FIG. 2 is a diagram schematically illustrating an extended reality system based on multimodal interfaces and data transmission method according to an embodiment of the present disclosure.

Referring to FIG. 2, a computer 200 receives and processes data about five senses of a person humans from an input device and transmits output data according to NFXM to the extended reality output devices. The computer 200 includes any computing device capable of receiving and processing data, and may be, for example, a server, a PC, a mobile device, or the like. The output data includes at least one device identifier (ID), at least one time limit, and at least one reproduction data.

Figure 3:
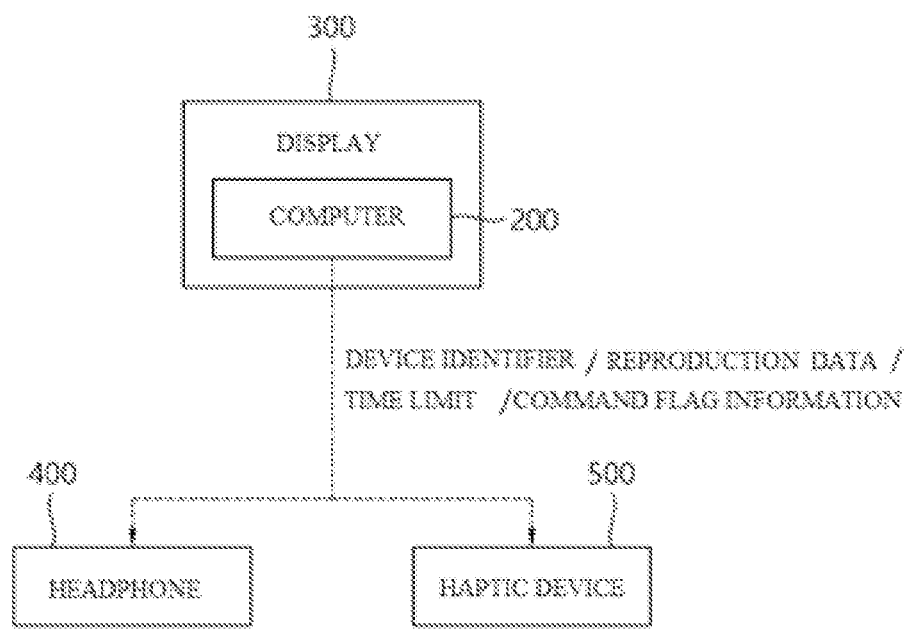
FIG. 3 is a diagram schematically illustrating an extended reality system based on multimodal interfaces and a data transmission method according to another embodiment of the present disclosure.

In the extended reality system based on multimodal interfaces according to an embodiment of the present disclosure, in general, an asynchronous transmission method in which a transmission device (e.g., computer 200 of FIG. 2 or computer 200 in display device 300 of FIG. 3) broadcasts data to all reception devices (e.g., display device 300, headphone 400, and haptic device 500 of FIG. 2, or headphone 400 and haptic device 500 of FIG. 3) connected to a wired or wireless network can be used.

In the conventional extended reality system, when a size of output data increases due to limitation of a transmission bandwidth, data is transmitted through an additional channel depending on the output data, and thus at least as many channels as the number of extended reality output devices are needed. However, this transmission is not suitable for a communication method that processes data in one channel, such as WiFi.

The device identifier (ID) indicates an extended reality output device to reproduce reproduction data. That is, the extended reality output device of a receiving side reproduces the received reproduction data only when there is a device identifier (ID) corresponding to itself among at least one device identifier (ID) included in the output data and does not reproduce the received reproduction data when there is no device identifier (ID) corresponding to itself.

The time limit indicates a period of time within which the reproduction data should be reproduced. In other words, the extended reality output device reproduces the reproduction data within the time limit included in the output data and does not reproduce the reproduction data when the time limit has elapsed.

Depending on the embodiment, the time limit may be a time range during which the reproduction data is valid. For example, when specific audio data is to be played at t1, the time limit may be set as (t1, t2). In this case, if the headphone receives the output data before t1, it plays audio data about t1, when the headphone receives the output data between t1 and t2, it plays audio data immediately, and when the headphone receives the output data after t2, it does not play audio data. In this case, a difference between t1 and t2 may be within approximately 1 ms.

Meanwhile, even when a distance between the computer 200 and the extended reality output device is long or the transmission time of the output data is lengthened due to communication constraints, by appropriately setting the time limit in consideration of lengthening of the transmission time, seamless extended reality content can be reproduced to the user in a distant place. For example, when considering the transmission time, if the additional time of approximately 1 second is needed, the time limit can be set as (t1+1, t2+1) in the example described above to provide seamless streaming to the user.

In addition, the time limit may be set in consideration of the size of a buffer of the extended reality output device. In order to provide the user with seamless extended reality content, a time limit can be set to reproduce the reproduction data when the buffer is filled after a predetermined period of time has elapsed after transmitting the reproduction data as long as the buffer of the extended reality output device can store in advance.

In the transmission method used in the conventional extended reality system, reproduction is often stopped if the buffer is not filled without skip logic in order to prevent damage to reproduction data such as video. Alternatively, when content cannot be reproduced in real time due to the distance or communication constraints, a timeout is applied to reset the reproduction data received during that period of time and give an opportunity to receive the content again. In this case, there is a problem in that the user experiences an experience in which the content is reproduced and then suddenly the reproduction stops.

According to the extended reality system and data transmission method according to the embodiments of the present disclosure, the reproduction data is reproduced only within the time limit and the reproduction data is not reproduced after the time limit, so that the user can experience extended reality content without a phenomenon that the reproduction stops in the middle. In particular, in a sufficiently fast communication environment such as 5G, the loss of reproduction data can be minimized during transmission, and thus the user can experience the seamless extended reality in a real time environment.

The reproduction data indicates data to be reproduced by the extended reality output device. For example, the reproduction data may include at least one of 3D video, stereo audio, 3D audio, vibration, weight, volume, pressure, and gesture.

The extended reality output device receives output data broadcasted by the computer 200, and reproduces, based on the device identifier (ID), only the reproduction data corresponding to itself within the time limit.

In FIG. 2, a display 300, a headphone 400, and a haptic device 500 are illustrated as the extended reality output devices, but the present disclosure is not limited thereto and may include any device capable of reproducing five senses for providing extended reality to the user. In addition, in FIG. 2, one display 300, one headphone 400, and one haptic device 500 are illustrated, but the extended reality system based on multimodal interfaces according to an embodiment of the present disclosure may include all of the devices described above, may include only some of the devices, or may include a plurality of each of the devices.

For example, the display 300 may be a head mounted display (HMD), a CAVE display, a 3D display, etc., and the haptic device 500 may be a glove, a band, a suit, an accessory, a wearable device, etc.

Meanwhile, for synchronization between the extended reality contents (e.g., video, audio, and haptic) through the time limit, an initialization operation of synchronizing operation time between the computer 200 and/or the extended reality output device is needed. To this end, the computer 200 and the extended reality output device include an internal real time clock (RTC) or timer for asynchronous communication. Synchronization of the operation time can be performed by repeatedly transmitting and receiving test data including time information about the basis of any one of the computer 200 and the extended reality output device, and in general, operation time synchronization between the computer 200 and the extended reality output device can be completed by repeatedly transmitting the test data over approximately 2 to 5 times.

When the synchronization of the operation time is completed, the computer 200 and the extended reality output device can transmit data including the time limit on the basis of the synchronized operation time to each other and can check the order of the reproduction data by checking the time limit in data received from other devices and provide the extended reality contents in which reproduction time points are synchronized to the user.

On the other hand, in addition to the broadcasting method described above (i.e., asynchronous transmission), in the extended reality system based on multimodal interfaces according to an embodiment of the present disclosure, a synchronous transmission method can be selectively used according to the type or setting of data. When the synchronous transmission method is used, reproduction data may be immediately reproduced despite the time limit, and in contrast, the reproduction data may not be reproduced despite the time limit.

For example, data related to user's safety may need to be immediately reproduced even if the time limit has not reached (e.g., before t1 in the example described above) or even after the time limit has elapsed (e.g., after t2 in the example described above), and conversely, there are cases where data related to user's safety cannot be reproduced even if the time limit has arrived (e.g., between t1 and t2 in the example described above). Accordingly, a synchronous transmission method can be used for specific data (e.g., data related to safety or security) depending on an application field.

In addition, it is possible for the user to directly determine whether or not to reproduce data by using a command flag CmdFlag to be described later. This will be described later with reference to FIGS. 4A and 4B.

FIG. 3 is a diagram schematically illustrating an extended reality system based on multimodal interfaces and data transmission method according to another embodiment of the present disclosure.

The system illustrated in FIG. 3 is different from the extended reality system illustrated in FIG. 2 in that the computer 200 is located inside the display 300. In the case of an application with a small amount of data to be processed, the computer 200 may process and transmit data in the form of a processor in any one of the extended reality output devices instead of processing and transmitting data as a separate external device. FIG. 3 illustrates that the computer 200 is located inside the display 300, but the present disclosure is not limited thereto, and the computer 200 may be located in any one of several extended reality output devices.

FIGS. 4A and 4B are diagrams illustrating a protocol format for a multimodal communication interface according to embodiments of the present disclosure.

Referring to FIGS. 4A and 4B, the protocol format has a mirror structure (i.e., Command MSB—Device Count MSB—Device Count LSB—Command LSB, Device ID—Packet size—Packets—Packet size—Device ID). The mirror structure is the same form as transmitting the same data twice and can provide a high level of data communication stability and reliability by performing a data validity check by comparing paired data from data transferred during asynchronous communication between the computer 200 and the extended reality output device.

The Command indicates information about the type of data, and 1 byte is allocated thereto. I/O indicates whether the corresponding data is input data or output data and may be set to 1 for input data and 0 for output data. The next five bits indicates whether the corresponding data includes reproduction data about which sense of sight, hearing, touch, smell, and taste. The reserve bit is a reserved bit that can be used as needed. For example, the reserve bit can be used when reproduction data related to other senses (e.g., temperature) in addition to the five senses is included.

The command flag CmdFlag indicates information indicating whether or not to reproduce the reproduction data. For safety or security purposes depending on the application field, the extended reality system needs to be restricted so that the extended reality output device does not reproduce the reproduction data even after receiving the reproduction data or needs to be restricted so that the reproduction data is reproduced only to a specific user. Alternatively, a specific user may need to restrict reproduction data so that the reproduction data is not reproduced in another user's output device. For example, when the extended reality system is used for surgical operation education, an instructor needs to restrict movement of haptic gloves worn by the learner so that movement out of a specific position does not occur in the haptic glove. In order to implement this, the command flag may include information indicating whether or not to reproduce the reproduction data to allow the extended reality output device to reproduce or not reproduce reproduction data based on the command flag.

The Device count indicates the number of devices that have transmitted/will receive data, and 1 byte is allocated thereto.

The Device ID indicates which extended reality output device the data corresponds to, and 2 bytes are allocated thereto.

The Packet Size indicates the size of a packet, and 4 bytes are allocated thereto.

The Packet includes at least one of measured data, reproduction data, and time limit. In the case of input data (i.e., when the I/O bit of the Command is 1), the Packet includes measured data transmitted to the computer 200 by a measurement device (e.g., a microphone, camera, MEMS, etc.), and in the case of output data (i.e., when the I/O bit of the Command is 0), the Packet includes reproduction data to be reproduced by the output device (e.g., display 200, headset 300, haptic device 500, etc.).

Hereinafter, the protocol format of FIGS. 4A and 4B will be described with reference to two examples of FIGS. 5 and 6.

Figure 5:
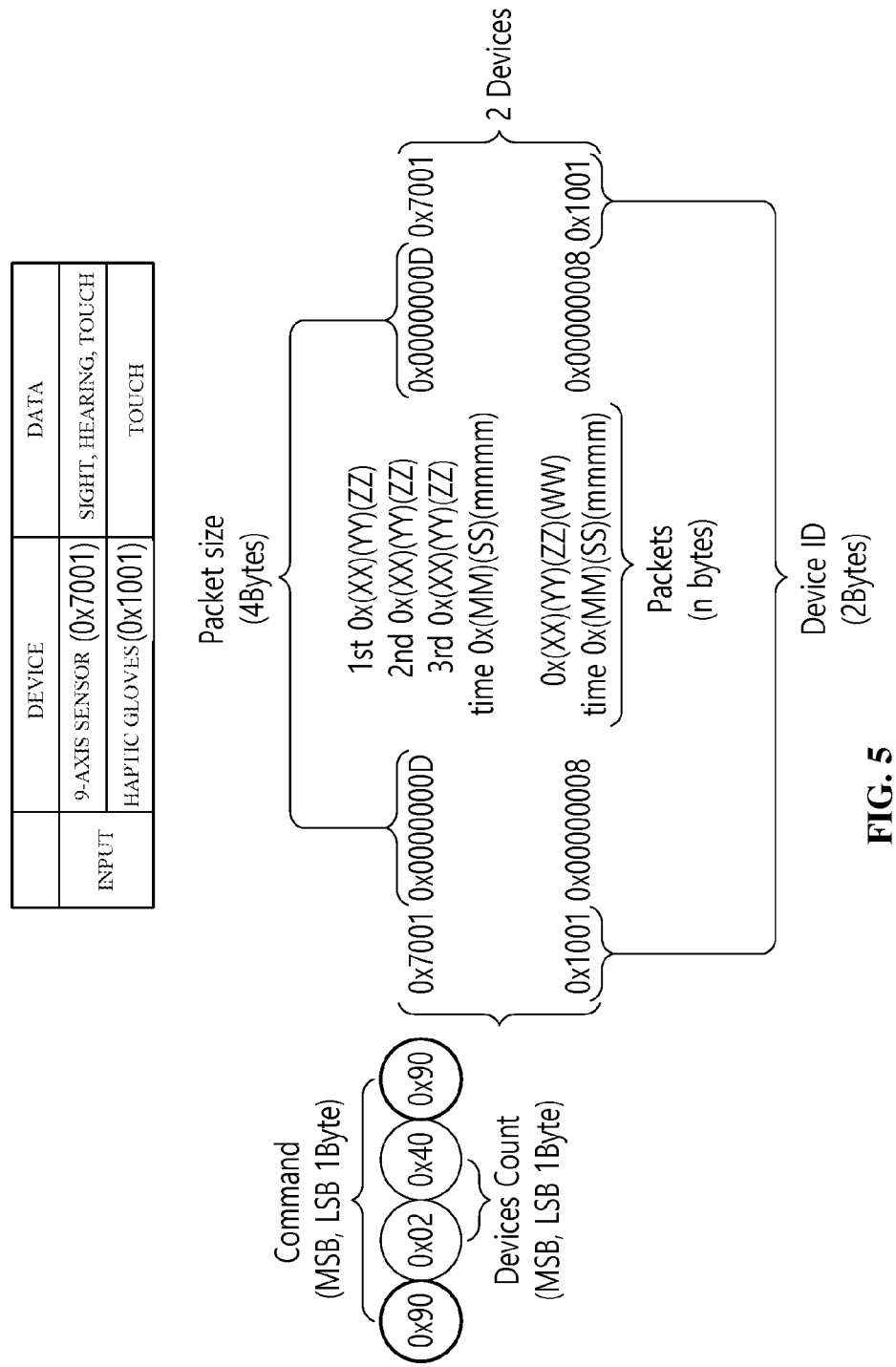
FIG. 5 is a diagram illustrating an input data format as an example of the protocol format of FIGS. 4A and 4B.

FIG. 5 is a diagram illustrating an input data format as an example of the protocol format of FIGS. 4A and 4B. Referring to FIG. 5, the displayed input data format is input data (0x90) including measured data related to sight, hearing, and touch and transmitted from two devices (0x02) and indicates that three pieces of measured data and time information are transmitted from a 9-axis sensor (0x7001) and that one piece of measured data and time information is transmitted from the haptic gloves (0x1001).

Figure 6:
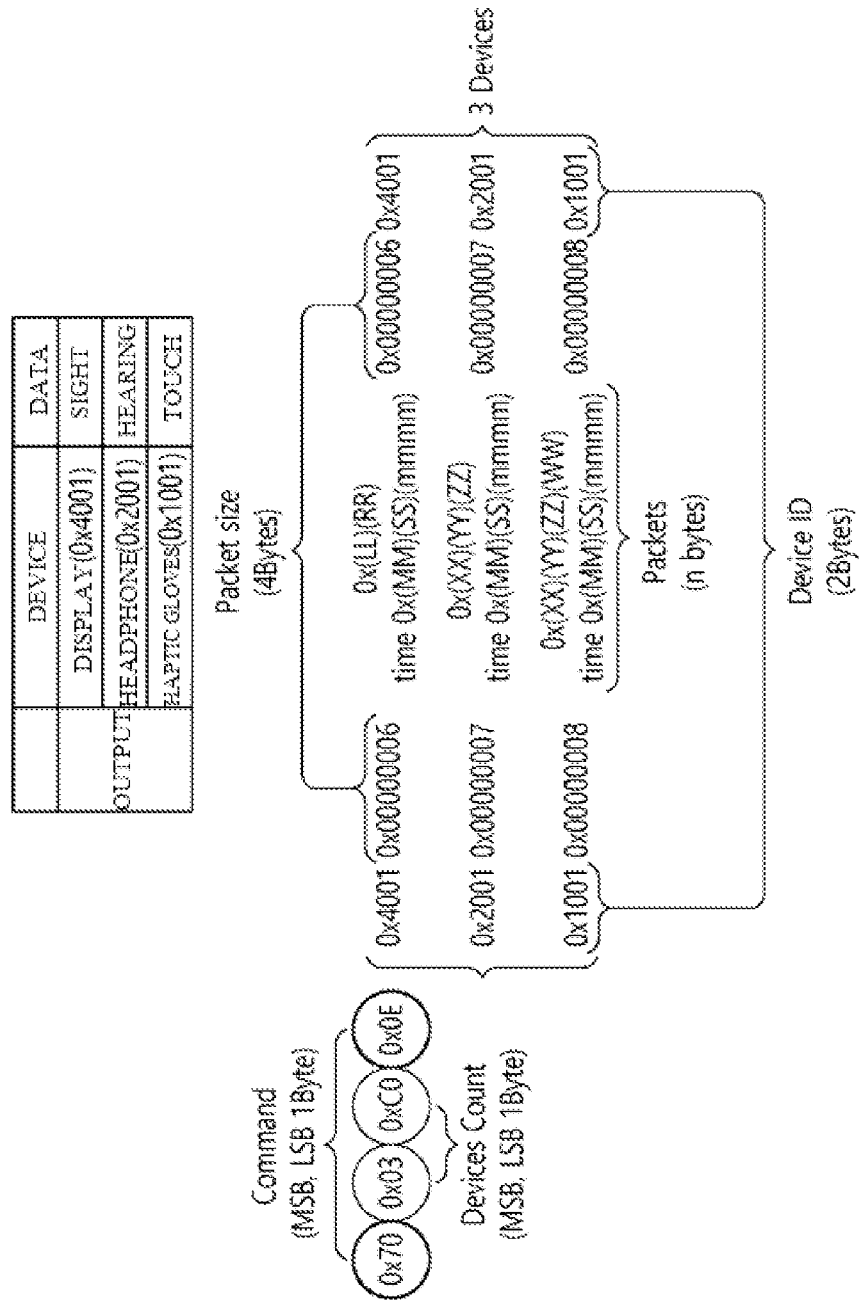
FIG. 6 is a diagram illustrating an output data format as an example of the protocol format of FIGS. 4A and 4B.

FIG. 6 is a diagram illustrating an output data format as an example of the protocol format of FIGS. 4A and 4B. Referring to FIG. 6, the displayed output data format is output data (0x70) including reproduction data related to sight, hearing, and touch and is transmitted to approximately 3r devices (0x03), and indicates data that allows the display (0x4001) to reproduce the reproduction data related to sight within the time limit, allows the headphone (0x2001) to reproduce the reproduction data related to hearing within the time limit, and allows the haptic gloves (0x1001) to reproduce the reproduction data related to touch within the time limit.

FIG. 7 is a diagram illustrating a data encryption method in a protocol format for the multimodal communication interface according to embodiments of the present disclosure.

As described above, in the extended reality system, safety or security issues may be important depending on the field of application, and the extended reality system needs to be restricted so that the extended reality output device does not reproduce even after receiving the reproduction data or may need to be restricted so that the reproduction data is reproduced only to a specific user. In addition, the reproduction data also needs to be restricted so that the reproduction data is reproduced only to a specific user by setting the authority differently for each user. For example, in the example of surgical operation, some movements need to be reproduced for all students, and some other movements need to be reproduced only for specific students. The extended reality system based on multimodal interfaces and data transmission method according to embodiments of the present disclosure can solve a security problem and authorization problem, that may occur during use, through data encryption.

Data encryption can be implemented by encrypting the entire area of the protocol format or encrypting only a partial area thereof. For example, referring to FIG. 7, the entire area of the protocol format can be encrypted (710), or only a partial area including the device identifier (ID) and reproduction data can be encrypted (730).

Alternatively, data encryption may be implemented so that the entire area and the partial area of the protocol format are individually encrypted and the range of users who can access each encrypted area is different. For example, referring to FIG. 7, by encrypting both the entire area 710 and the partial area 730 of the protocol format, the entire area 710 can be set to be accessible through a public key provided to all users and the partial area 730 may be set to be accessible through a personal key provided only to a specific user. For example, encryption techniques such as AES and PKI may be used.

Figure 8A:
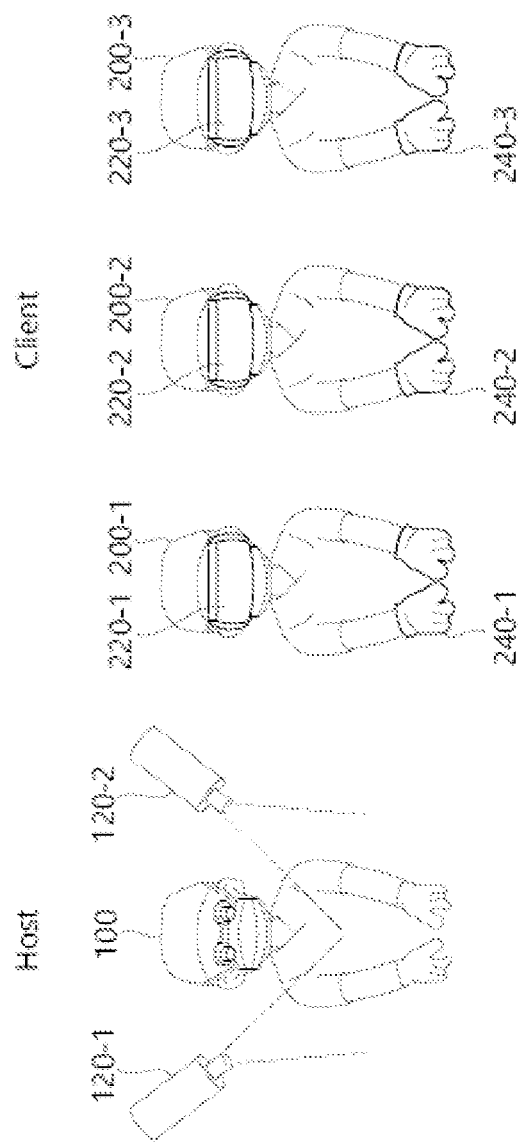
FIGS. 8A to 8C are diagrams illustrating embodiments in which the extended reality system according to an embodiment of the present disclosure is applied to a surgical training system.
Figure 8B:
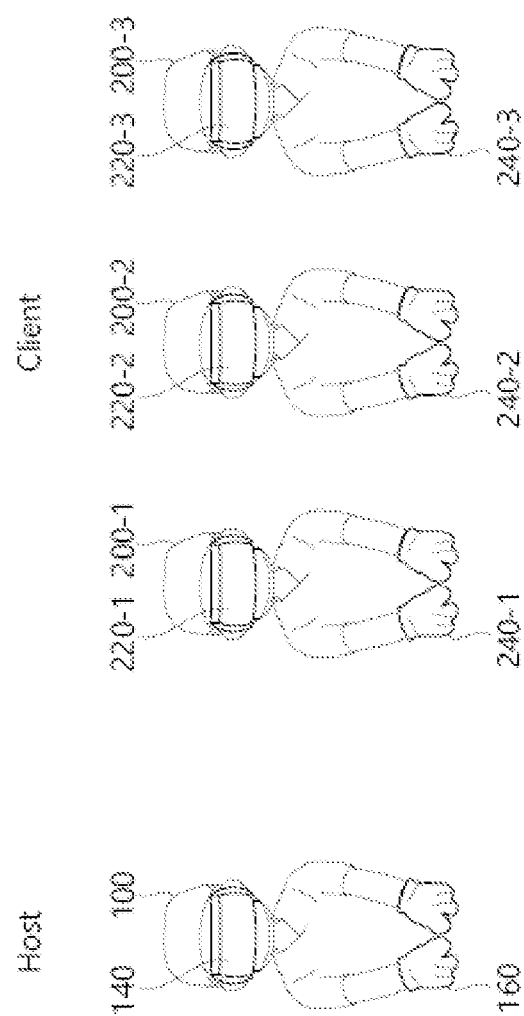
Figure 8C:
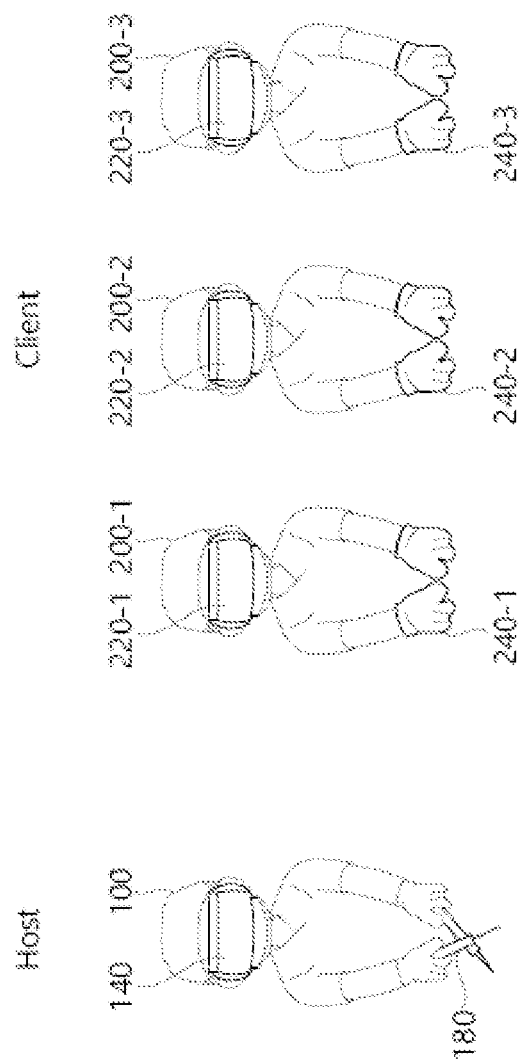

FIGS. 8A to 8C are diagrams illustrating the embodiment in which the extended reality system according to an embodiment of the present disclosure is applied to a surgical training system.

Referring to FIGS. 8A to 8C, the surgical training system may be configured with a device related to an instructor as a host and a device related to a learner as a client. FIGS. 8A to 8C illustrate one instructor and three learners but are not limited thereto.

In FIG. 8A, an instructor 100 performs an actual surgery and sensors 120-1 and 120-2 disposed in a surgery room and captures movement of the instructor 100. The learner 200 receives surgical training by performing virtual surgery according to the movement of the instructor 100 while wearing an HMD 220 and haptic gloves 240. The surgical training system can further include a computer (not illustrated) that processes output data including a device identifier (ID), reproduction data, and a time limit from the movement of the instructor 100 captured by the sensors 120-1 and 120-2 and broadcasts the output data to the HMD 220 and the haptic gloves 240. The HMD 220 and the haptic gloves 240 of the learner 200 receive the output data, check the device identifier (ID), and output the reproduction data corresponding to each of the HMD 220 and the haptic gloves 240 within the time limit. For example, the reproduction data of the HMD 220 may be a virtual surgical environment, and the reproduction data of the haptic gloves 240 may be a position, movement, or vibration of a hand.

In FIG. 8B, the instructor 100 performs virtual surgery while wearing an HMD 140 and haptic gloves 160, and the learner 200 receives surgical training by performing the same virtual surgery as the instructor 100 while wearing the HMD 220 and the haptic gloves 240. The surgical training system may further include a computer (not illustrated) that receives data about fine movements of the instructor 100 from the HMD 140 and the haptic gloves 160 of the instructor 100, processes data to be reproduced in the HMD 220 and the haptic gloves 240 of the learner 200 based on the data related to the movements and transmits the reproduction data to the HMD 220 and the haptic gloves 240 (not illustrated). For example, the reproduction data of the HMD 220 may be a virtual surgical environment, and the reproduction data of the haptic gloves 240 may be a position, movement, or vibration of a hand.

In FIG. 8C, the instructor 100 performs virtual surgery using the HMD 140 and a controller 180, and the learner 200 receive surgical training by performing the same virtual surgery as the instructor 100 while wearing the HMD 220 and the haptic gloves 240. The surgical training system may further include a computer (not illustrated) that receives data about fine movements of the instructor 100 from the HMD 140 and the controller 180 of the instructor 100, processes data to be reproduced in the HMD 220 and the haptic gloves 240 of the learner 200 based on the data related to the movements and transmits the reproduction data to the HMD 220 and the haptic gloves 240. For example, the reproduction data of the HMD 220 may be a virtual surgical environment, and the reproduction data of the haptic gloves 240 may be a position, movement, or vibration of a hand. The controller 180 of FIG. 8C may capture the movement of the instructor 100 more precisely than the haptic gloves 160 of FIG. 8B.

Figure 9:
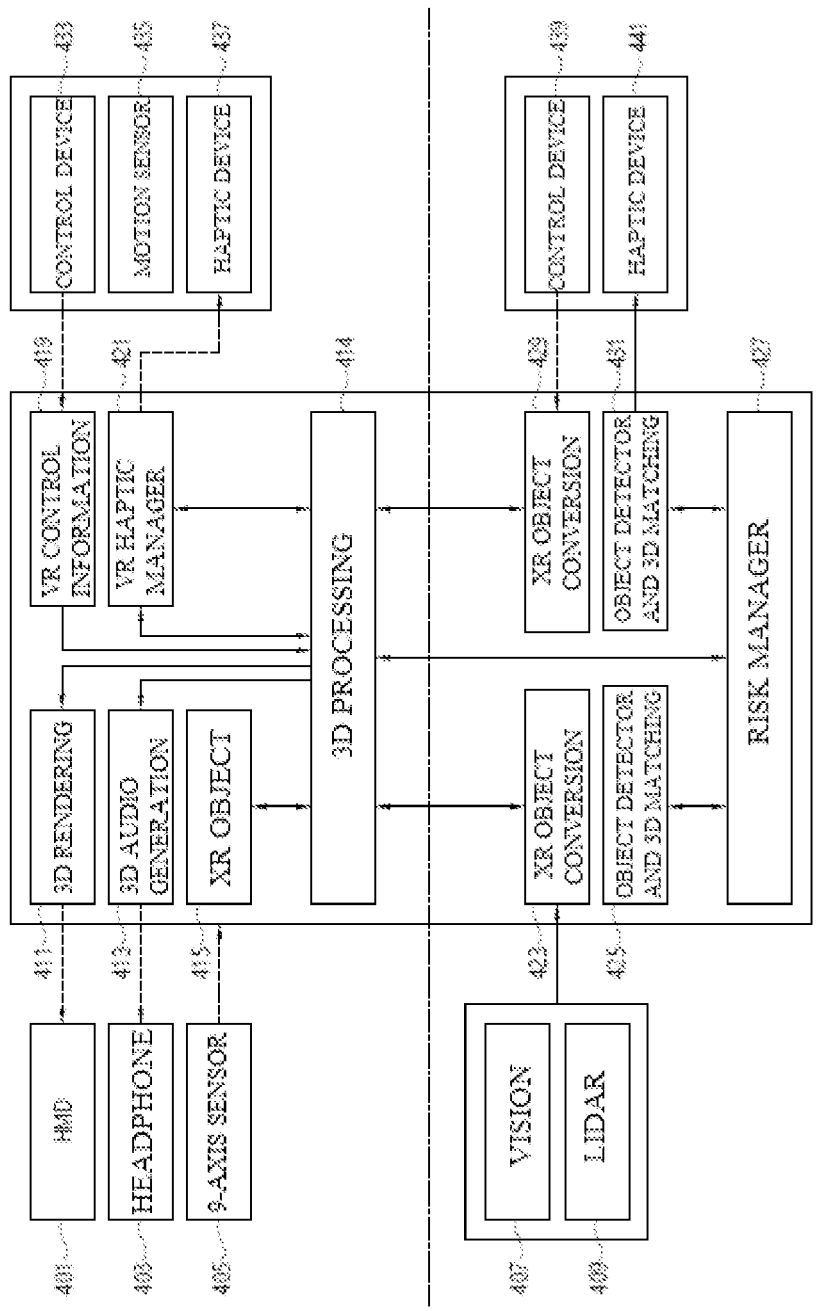
FIG. 9 is a diagram illustrating a data processing flow of the surgical training system of FIGS. 8A to 8C.

FIG. 9 is a diagram illustrating a data processing flow of the surgical training system of FIGS. 8A to 8C. In FIG. 9, based on a computer 400, devices illustrated on the left are devices related to the instructor 100 and devices illustrated on the right are devices related to the learner 200.

Referring to FIG. 9, an HMD 401, a headphone 403, and a 9-axis sensor 405 are devices worn by the instructor 100 when the instructor 100 performs the virtual surgery as illustrated in FIG. 8B or 8C. The HMD 401 displays a 3D rendered virtual surgery situation generated by the computer 400 by performing 3D processing 414 on an XR object 415, the headphone 403 plays 3D audio 413 generated by the computer 400 by performing 3D processing on the XR object 415, and the 9-axis sensor 405 transmits information related to the movement of the instructor 100 to the computer 400 in the virtual surgery situation. In FIG. 9, it should be noted that an arrow indicated by a dotted line indicates asynchronous data transmission such as broadcasting, and an arrow indicated by a solid line indicates synchronous data transmission. The 9-axis sensor 405 may be included in the haptic gloves 160 of FIG. 8B or the control device 180 of FIG. 8C. In FIG. 9, it is illustrated that information about the movement of the instructor 100 is obtained using the 9-axis sensor 405, but the present disclosure is not limited thereto, and any type of device capable of measuring or obtaining information about the movement of the instructor 100 may be used. The 3D processing 414 includes placing the XR object 415 in the virtual surgical environment.

Figure 10:
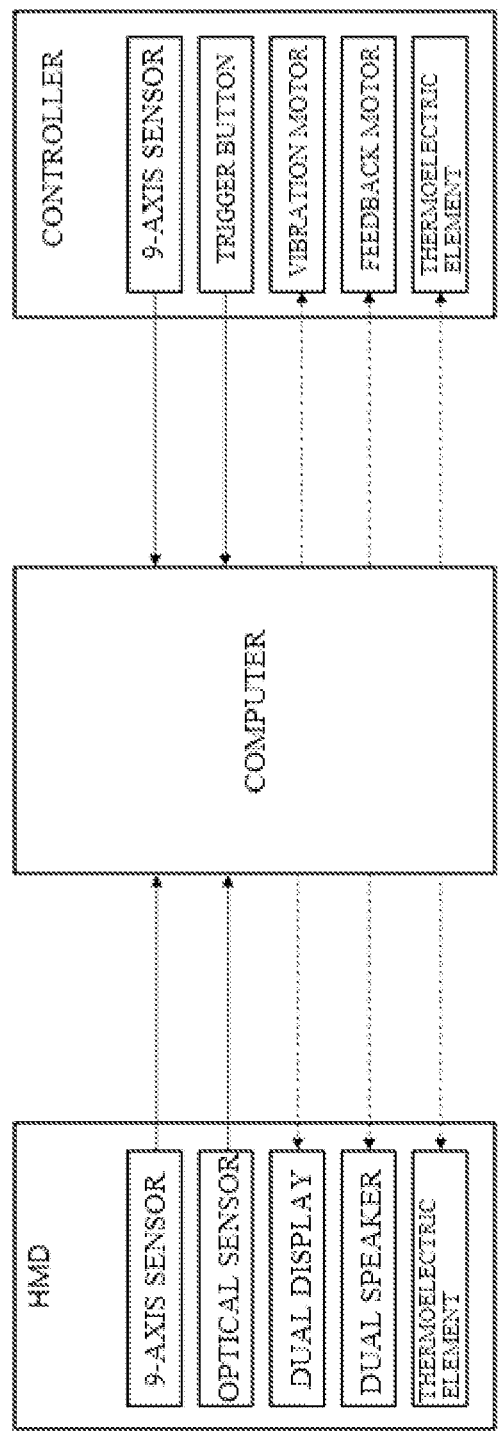
FIG. 10 is a diagram illustrating an embodiment in which the extended reality system according to an embodiment of the present disclosure is applied to a welding training system.

FIG. 10 is a diagram illustrating an embodiment in which the extended reality system according to an embodiment of the present disclosure is applied to a welding training system.

Referring to FIG. 10, the welding training system can include a computer, an HMD, and a controller.

The computer generates output data by performing 3D processing on user's position and orientation data acquired from a 9-axis sensor of the HMD, spatial recognition data acquired from an optical sensor of the HMD, welding machine's position and orientation data acquired from the 9-axis sensor of the controller, ON/OFF data acquired from a trigger button on the controller, and extended reality object data, and broadcasts the output data. The extended reality object data can include material information including 3D models such as weldment, arc torch, gas torch, etc., texture of welding material (e.g., metal, steel, aluminum, stainless steel, copper, carbon steel, tungsten, nickel, etc.), a welding spark, a melting point, and a welding effect.

The computer generates, as a result of the 3D processing, reproduction data including a 3D rendered welding image to be reproduced by a dual display of the HMD, audio according to the binaural effect to be reproduced by a dual speaker of the HMD, welding heat to be reproduced by the thermoelectric element of the HMD, welding vibration feedback to be reproduced by a vibration motor of the controller, welding rod force to be reproduced by a feedback motor of the controller, and heat transferred to the welding machine to be reproduced by the thermoelectric element of the controller, and broadcasts output data to which a device identifier (ID) (i.e., dual display, dual speaker, and thermoelectric element of the HMD, and vibration motor, feedback motor, and thermoelectric element of the controller) corresponding to each reproduction data and time limit are added.

The HMD can include, as input devices, the 9-axis sensor for tracking the user's head and the optical sensor (e.g., a camera and/or a LIDAR sensor) for spatial recognition, and include, as output devices, the dual display for displaying a 3D rendered welding image, the dual speaker for playing audio according to the binaural effect, and the thermoelectric element for reproducing heat transferred to the user's face during welding. Each of the dual display, dual speaker, and thermoelectric element included in the HMD receives output data broadcasted by the computer, checks the device identifier (ID) from the output data, and then reproduces only the reproduction data that corresponds to itself within the time limit.

The controller plays a role of a welding machine directly operated by the user in the welding training system, and can include, as input devices, the 9-axis sensor for tracking movement of the welding machine and the trigger button for performing welding, and include, as output devices, the vibration motor for reproducing vibration, the feedback motor for reproducing the welding rod force, and the thermoelectric element for reproducing heat transferred to the welding machine during welding. Each of the vibration motor, feedback motor, and thermoelectric element included in the controller receives output data broadcasted by the computer, checks the device identifier (ID) from the output data, and reproduces only reproduction data corresponding to itself within the time limit.

Figure 11:
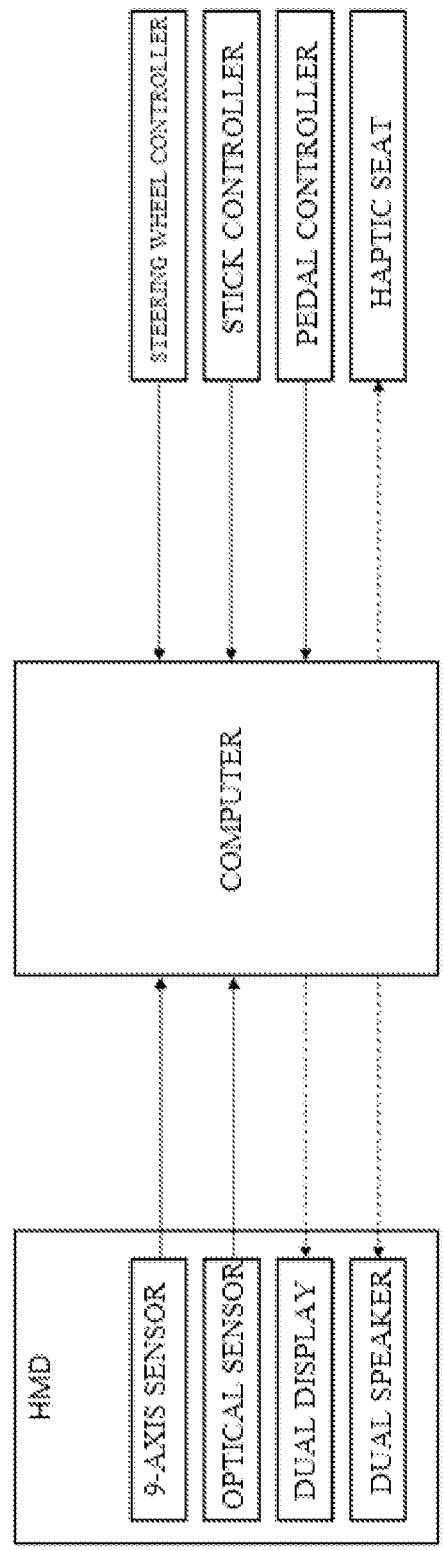
FIG. 11 is a diagram illustrating an embodiment in which the extended reality system according to an embodiment of the present disclosure is applied to an excavator training system.

FIG. 11 is a diagram illustrating an embodiment in which the extended reality system according to an embodiment of the present disclosure is applied to an excavator training system.

Referring to FIG. 11, the excavator training system may include a computer, an HMD, a steering wheel controller, a stick controller, a pedal controller, and a haptic seat.

The computer generates output data by performing 3D processing on user's position and orientation data acquired from a 9-axis sensor of the HMD, measure 3D gesture data acquired from the steering wheel controller, position data of the boom, arm, and bucket of the excavator obtained from the stick controller, acceleration data of the excavator obtained from the pedal controller, and extended reality object data, and broadcasts the output data.

The computer generates, as a result of the 3D processing, reproduction data including a 3D rendered image to be reproduced by a dual display, audio according to the binaural effect to be reproduced by a dual speaker, 3D pressure and capacitive output to be reproduced by the haptic seat, and broadcasts output data, to which a device identifier (ID) (i.e., dual display, dual speaker, and haptic seat) corresponding to each reproduction data and time limit are added.

The HMD may include, as input devices, a 9-axis sensor for tracking a user's head and an optical sensor (e.g., a camera and/or a LIDAR sensor) for spatial recognition, and include, as output devices, the dual display for displaying a 3D rendered image and the dual speaker for playing audio according to the binaural effect. The dual display and dual speaker receives output data broadcasted by the computer, check the device identifier (ID) from the output data, and reproduce only the reproduction data that corresponds to itself within the time limit.

Figure 12:
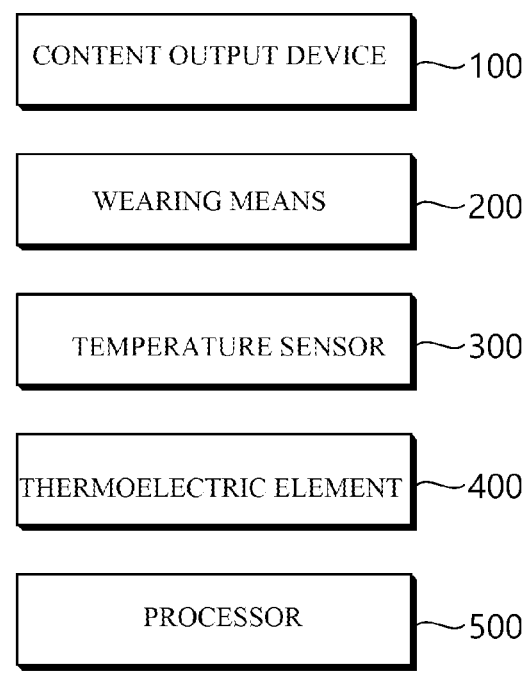
FIG. 12 is a block diagram illustrating a configuration of a wearable temperature transfer device that can be used in an extended reality system based on multimodal interfaces according to another embodiment of the present disclosure.

FIG. 12 is a block diagram illustrating a configuration of a wearable temperature transfer device that can be used in an extended reality system based on multimodal interfaces according to another embodiment of the present disclosure. The wearable temperature transfer device may be in the form of, for example, a headphone, a head mounted display (HMD), a face mounted display (FMD), a helmet mounted display, or a garment.

Referring to FIG. 12, a wearable temperature transfer device according to another embodiment of the present disclosure includes a content output device 100, a wearing means 200, a temperature sensor 300, a thermoelectric device 400, and a processor 500.

The content output device 100 transfer the content to the user. For example, the content output device 100 may be a speaker 101 of FIG. 13 that plays audio content or a display 103 of FIG. 15 that displays video content such as a virtual reality (VR) simulation. The content output device 100 can be attached to a specific position of the wearing means 200 to enable transferring of content to the user.

The wearing means 200 enables the user to wear the wearable temperature transfer device on his or her body. For example, the wearing means 200 may be a headband 201 in FIG. 13 surrounding the user's head when the wearable temperature transfer device is a headphone, or a body 203 in FIG. 15 to which the display is attached and a band (not illustrated) when the wearable temperature transfer device is an HMD.

The temperature sensor 300 measures ambient temperature of the wearable temperature transfer device. Here, "ambient" means the surroundings of the temperature transfer device itself, and thus "ambient temperature" means includes a body temperature of the user as well as an external temperature (e.g., air temperature or room temperature) when the user wears the temperature transfer device.

Depending on the embodiment, the wearable temperature transfer device may include a plurality of temperature sensors 300. For example, the plurality of temperature sensors 300 can be attached to each of an inner surface (a surface that contacts the user's body) and an outer surface (a surface that does not contact the user's body) of the wearable temperature transfer device to measure the temperature at a corresponding point (hereinafter, the inner surface of the temperature transfer device refers to the surface that contacts the user's body, and the outer surface refers to the surface that does not contact the user's body). In this case, the temperature at a point where the temperature sensor 300 is not attached can be estimated using the temperature at a point at which the temperature sensor 300 is attached.

The thermoelectric element 400 transfers temperature to the user. The thermoelectric element 400 can heat the user through an exothermic reaction and can cool a user through an endothermic reaction. How much temperature (i.e., how much heating or how much cooling) the thermoelectric element 400 transfers to the user is determined by the processor 500 in consideration of content and/or ambient temperature. The thermoelectric device 400 can be implemented as, for example, an element having the thermoelectric effect such as the Seebeck effect, Peltier effect, or Thompson effect, as well as any element using a similar technology in another manner capable of generating temperature according to a determination of the user or processor.

Depending on the embodiment, the wearable temperature transfer device can include a plurality of thermoelectric elements 400. For example, the plurality of thermoelectric elements 400 are attached to the inner surface of the wearable temperature transfer device, so that different temperatures can be transferred to the user for each region to which each thermoelectric element 400 is attached.

The processor 500 determines a temperature to be transferred to the user by the thermoelectric element 400 in consideration of at least one of content and ambient temperature.

For example, the processor 500 can determine the temperature to be transferred to the user by the thermoelectric element 400 according to contents of content.

When the content is audio (e.g., music), the processor 500 can determine the temperature to be transferred to the user by the thermoelectric element 400 according to a pitch (i.e., frequency), a tempo, a beat, etc. The processor 500 can determine the temperature so that the thermoelectric element 400 generates a relatively high temperature in a high tone and a relatively low temperature in a low tone. In addition, the processor 500 can determine the temperature so that the thermoelectric element 400 generates a relatively high temperature at a fast tempo and a relatively low temperature at a slow tempo. In addition, the processor 500 can provide a temperature maintenance function according to a change in the body temperature of the user. When listening to audio, the body temperature of the user may change depending on the pitch, tempo, beat, etc. For example, when listening to music or sound with strong beats, the body temperature of the user rises, so that the user may feel uncomfortable as he or she becomes relatively hot. In this case, the processor 500 can determine the temperature of the thermoelectric element 400 according to the body temperature of the user measured by the temperature sensor 300 so that the user can comfortably listen to the audio.

When the content is video (e.g., XR simulation), the processor 500 can determine the temperature to be transferred by the thermoelectric element 400 to the user according to the XR object. If a hot object exists near the user in the XR environment, the processor 500 can determine the temperature so that the thermoelectric element 400 attached in the direction in which the hot object exists generates a relatively high temperature and the thermoelectric element 400 attached in the opposite direction generates a relatively low temperature. The temperature transfer device can additionally include a sensor (e.g., a 9-axis sensor) capable of measuring the user's rotation, and when the user rotates and the relative position of the hot object changes, the processor 500 can control the temperature of the thermoelectric element 400 based on the changed relative position.

Meanwhile, the determination of the temperature according to the contents of content described above can be performed by the processor 500 analyzing the contents of content, as in the above example, and can be performed by a producer of content or a user. For example, a producer of audio content can determine in advance what temperature the user experiences for each audio playback according to his or her creative intention and insert temperature information for each playback time into the audio content. In this case, the processor 500 can extract temperature information for each playback time and control the thermoelectric element 400 to transfer the corresponding temperature to the user. In addition, for example, like setting an audio equalizer, the user can set the temperature to be output by the thermoelectric element 400 according to the pitch, tempo, beat, playback time, etc., and the processor 500 may control the thermoelectric element 400 according to the user's setting.

In addition, for example, the processor 500 can determine the temperature to be transferred by the thermoelectric element 400 to the user according to the body temperature of the user. As described above, the temperature sensor 300 can be attached to the inner surface of the wearable temperature transfer device to measure the body temperature of the user at the corresponding point. The processor 500 can correct the temperature determined according to the contents of content and control the thermoelectric element 400 to transfer a relative temperature according to the measured body temperature of the user. In the case of transferring a relatively high temperature according to the contents of content, the processor 500 can control the thermoelectric element 400 so that the thermoelectric element 400 transfers a temperature of 37° C. when the body temperature of the user is 36° C., and the thermoelectric element 400 transfers a temperature of 38° C. when the body temperature of the user is 37° C. In contrast, in the case of transferring a relatively low temperature according to the contents of content, the processor 500 may control the thermoelectric element 400 so that the thermoelectric element 400 transfers a temperature of 35° C. when the body temperature of the user is 36° C., and the thermoelectric element 400 transfers a temperature of 36° C. when the body temperature of the user is 37° C.

In addition, for example, the processor 500 can determine the temperature to be transferred to the user by the thermoelectric element 400 according to the external temperature (e.g., air temperature or room temperature). As described above, the temperature sensor 300 can be attached to the outer surface of the wearable temperature transfer device to measure the external temperature. The processor 500 can control the thermoelectric element 400 to transfer a specific temperature according to the measured external temperature. When the outside temperature is low, such as in winter, the processor 500 can control the thermoelectric element 400 to transfer a relatively high temperature to provide a heating function to the user. In contrast, when the external temperature is high, such as in summer, the processor 500 can control the thermoelectric element 400 to transfer a relatively low temperature to provide a cooling function to the user.

Figure 13:
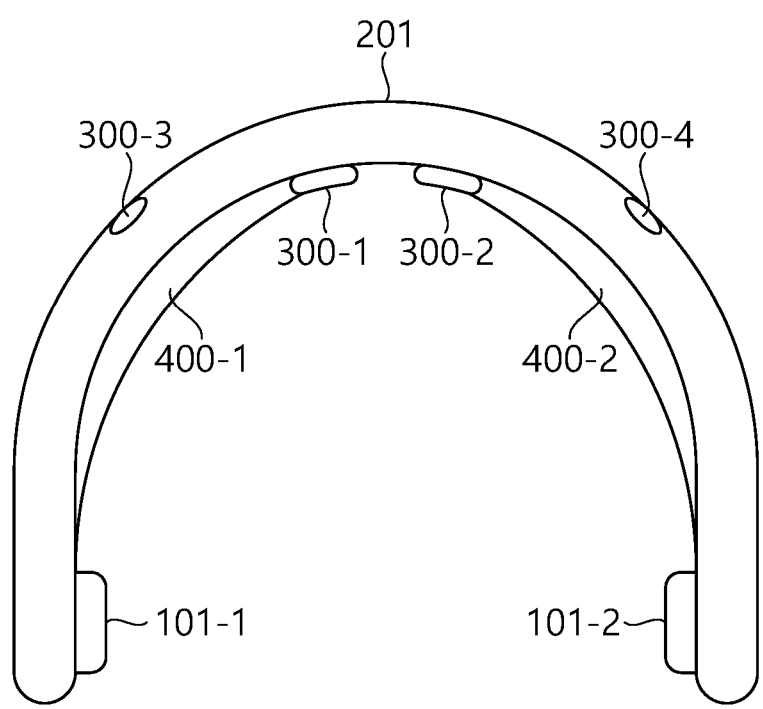
FIG. 13 is a diagram schematically illustrating a structure of a temperature transfer headphone according to another embodiment of the present disclosure.

FIG. 13 is a diagram schematically illustrating a structure of a temperature transfer headphone according to another embodiment of the present disclosure.

Referring to FIG. 13, the temperature transfer headphone according to another embodiment of the present disclosure may include speakers 101-1 and 101-2, a headband 201, temperature sensors 300-1 to 300-4, and thermoelectric elements 400-1 and 400-2. Although not explicitly illustrated in FIG. 13, the temperature transfer headphone may include a processor, and the processor may be located inside the headband 201.

The speakers 101-1 and 101-2 play audio content such as music. In FIG. 13, two speakers 101-1 and 101-2 are illustrated, but is not limited thereto, and a larger number of speakers may be included in order to implement multiple channels, such as 5.1 channels or 7.1 channels.

The headband 201 can be configured to wrap the user's head so that the user can wear the temperature headphone. The speakers 101-1 and 101-2, temperature sensors 300-1 to 300-4, and thermoelectric elements 400-1 and 400-2 can be coupled to the headband 201. As illustrated in FIG. 13, the speakers 101-1 and 101-2, temperature sensors 300-1 and 300-2, and thermoelectric elements 400-1 and 400-2 can be coupled to the inner surface of the headband 201 2), and the temperature sensors 300-3 and 300-4 can be coupled to the outer surface of the headband 201.

The temperature sensors 300-1 to 300-4 measure the temperature at positions where the temperature sensors 300-1 to 300-4 are attached. In FIG. 13, four temperature sensors 300-1 to 300-4 are illustrated, but is not limited thereto, and a larger number or a smaller number of temperature sensors can be included. The temperature sensors 300-1 and 300-2 attached to the inner surface of the headband 201 can contact the user's skin when the user wears the temperature transfer device to measure the body temperature of the user. The temperature sensors 300-3 and 300-4 attached to the outer surface of the headband 201 can measure the external temperature (e.g., air temperature or room temperature) when the user wears the temperature transfer device.

The thermoelectric elements 400-1 and 400-2 transfer) the temperature determined by the processor 500 to the user. In FIG. 13, two thermoelectric elements 400-1 and 400-2 in a shape that can come into contact with the inner surface of the headband 201 are illustrated, but is not limited thereto, and a larger number or a smaller number of thermoelectric elements can be included in order to subdivide a temperature transfer point.

Meanwhile, the temperature transfer headphone can be used alone to play audio content but can also be used with other devices that include a display to play video and audio combined content.

Figure 14:
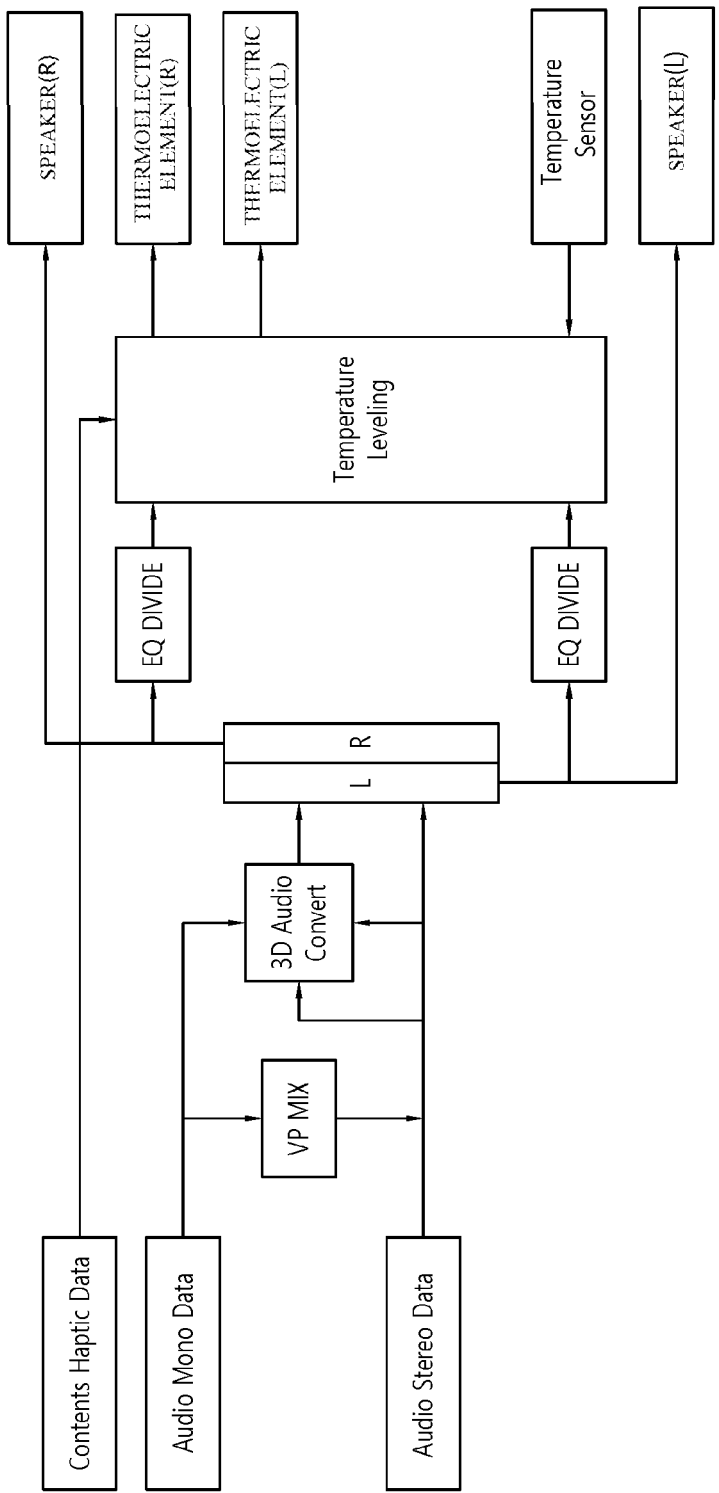
FIG. 14 is a diagram schematically illustrating a data processing flow in the temperature transfer headphone according to another embodiment of the present disclosure.

FIG. 14 is a diagram schematically illustrating a data processing flow in a temperature transfer headphone according to another embodiment of the present disclosure. Data processing illustrated in FIG. 14 can be performed by the processor 500.

Audio data can include at least one of audio mono data and audio stereo data, and when there is only audio mono data, it may be converted into audio stereo data using VP Mix. Audio mono data and audio stereo data can be separated into a left output and a right output after being subjected to 3D audio conversion. The separated left and right outputs can be played through respective speakers.

Meanwhile, temperature leveling may be performed based on content haptic data, audio data, and measured temperature. In this case, the audio data separated into left and right outputs can be separated for each frequency by an equalizer and used for temperature leveling. As described above, the temperature leveling may be determining the temperature to be transferred to the user based on a factor (i.e., content haptic data and audio data in the example of FIG. 14) determined by a producer of content and a temperature measured by a temperature sensor.

Figure 15:
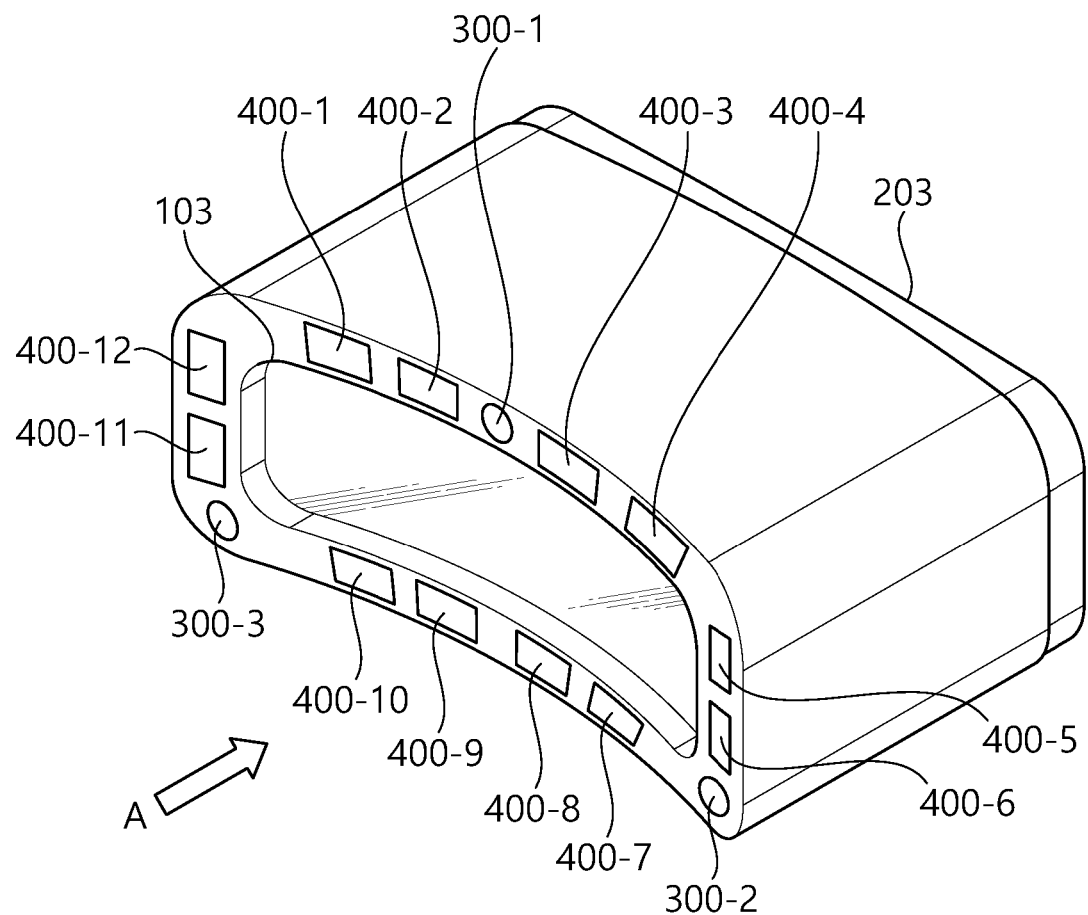
FIG. 15 is a diagram schematically illustrating a structure of a temperature transfer HMD according to another embodiment of the present disclosure.

FIG. 15 is a diagram schematically illustrating a structure of a temperature transfer HMD according to another embodiment of the present disclosure.

Referring to FIG. 15, the temperature transfer HMD according to another embodiment of the present disclosure can include a display 103, a body 203, temperature sensors 301-1 to 301-3, and thermoelectric devices 400-1 to 400-12. Although not explicitly illustrated in FIG. 15, the temperature transfer HMD can include a processor, and the processor can be located inside the body 203.

The display 103 plays video content.

The display 103, the temperature sensors 300-1 to 300-3, and the thermoelectric elements 400-1 to 400-12 can be coupled to the body 203. As illustrated in FIG. 15, the temperature sensors 300-1 to 300-3 and the thermoelectric elements 400-1 to 400-12 can be coupled to the inner surface of the body 203.

The temperature sensors 300-1 to 300-3 measure the temperatures at the positions where the temperature sensors 300-1 to 300-3 are attached. In FIG. 15, three temperature sensors 300-1 to 300-3 are illustrated, but are not limited thereto, and can include a larger number or a smaller number of temperature sensors. In addition, although not explicitly illustrated in FIG. 15, a temperature sensor is also attached to the outer surface of the body to measure the external temperature.

The temperature sensors 300-1 to 300-3 may contact the user's skin when the user wears the temperature transfer device to measure the body temperature of the user. The temperatures at the points where the temperature sensors 300-1 to 300-3 are not attached may be estimated using the temperatures at the points where the temperature sensors 300-1 to 300-3 are attached. Estimation of the temperature will be described later with reference to FIGS. 16A and 16B.

The thermoelectric elements 400-1 to 400-12 transfer the temperature determined by the processor 500 to the user. In FIG. 15, as an example different from the temperature transfer headphone of FIG. 13, twelve thermoelectric elements 400-1 to 400-12 are attached to the inner surface of the body 203 but are not limited thereto.

Meanwhile, the temperature transfer HMD can be used alone to play video content but can also be used with other devices including the speaker to play video and audio combined content.

Figure 16A:
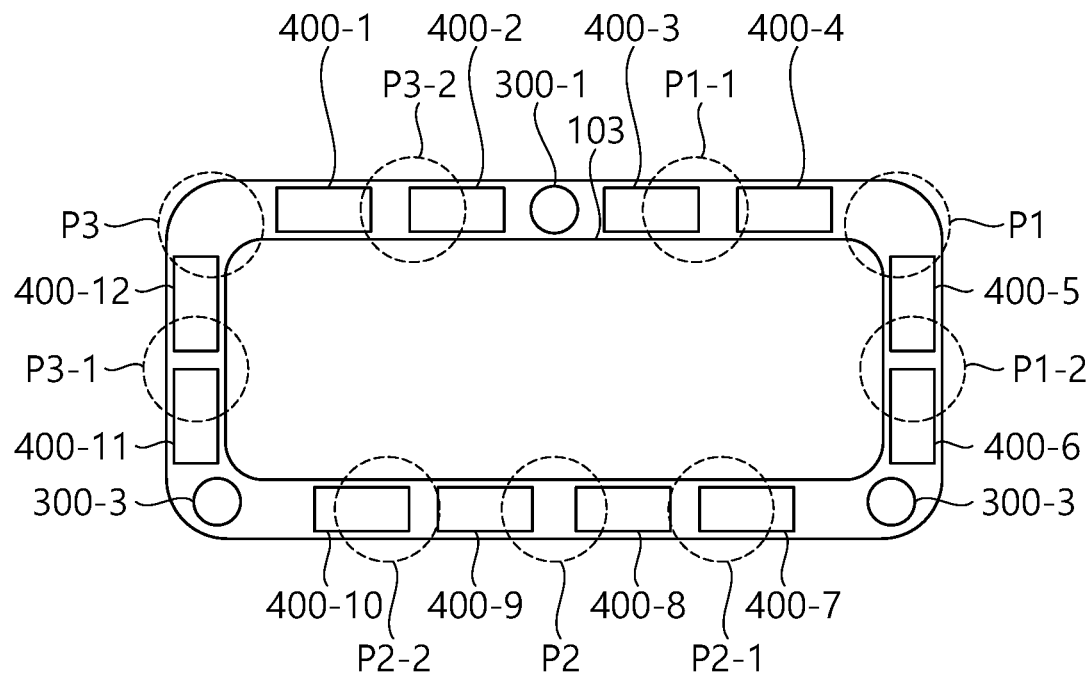
FIGS. 16A and 16B are diagrams schematically illustrating a method of estimating a temperature at a point where a temperature sensor is not attached in the temperature transfer HMD of FIG. 15.
Figure 16B:
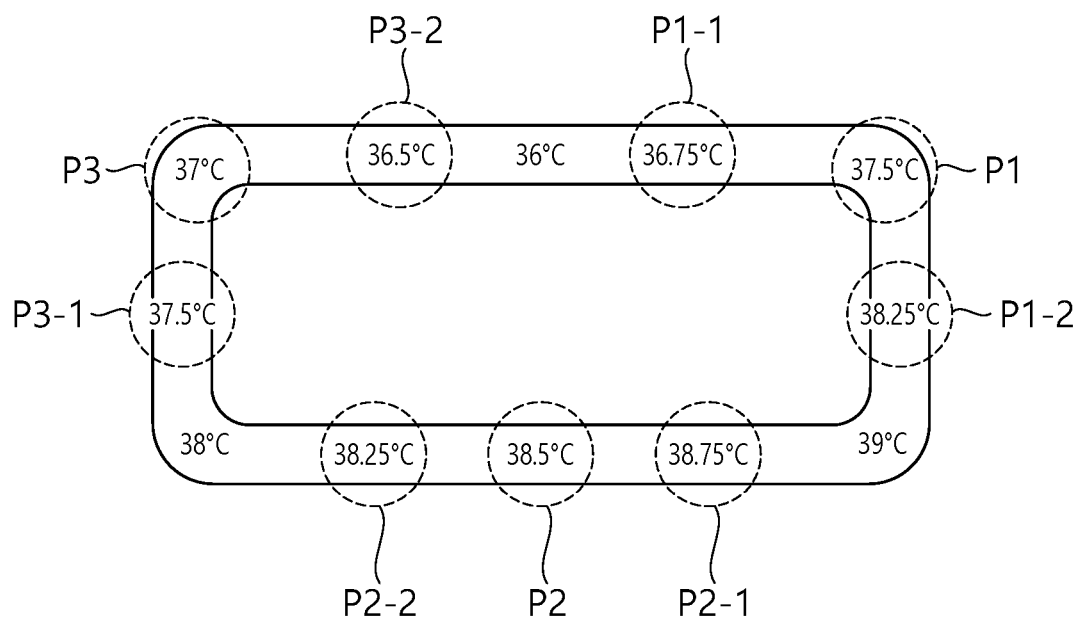

FIGS. 16A and 16B are diagrams schematically illustrating a method of estimating a temperature at the point where the temperature sensor is not attached in the temperature transfer HMD of FIG. 15. FIGS. 16A and 16B are plan views of the temperature transfer HMD of FIG. 15 when viewed from A direction.

Referring to FIG. 16A, as illustrated in FIG. 15, three temperature sensors 300-1 to 300-3 and twelve thermoelectric elements 400-1 to 400-12 are attached to the inner surface of the temperature transfer HMD. Each of the temperature sensors 300-1 to 300-3 measures the temperature at the point where each temperature sensor is attached, and the thermoelectric elements 400-1 to 400-12 transfer the temperature determined by the processor 500 to the user. In this case, the processor 500 should determine the temperature to be transferred to the user by the thermoelectric elements 400-1 to 400-12 attached to the points where the temperature sensors 300-1 to 300-3 are not attached based on the temperatures measured by the temperature sensors 300-1 to 300-3.

To this end, the processor 500 can estimate the temperatures at points P1, P1-1, P1-2, P2, P2-1, P2-2, P3, P3-1, and P3-3 where the temperature sensors 300-1 to 300-3 are not attached based on the temperatures measured by the temperature sensors 300-1 to 300-3. For example, the processor 500 can estimate the temperature at the points P1, P1-1, P1-2, P2, P2-1, P2-2, P3, P3-1, and P3-3, where the temperature sensors 300-1 to 300-3 are not attached, using an average of the temperatures measured by the temperature sensors 300-1 to 300-3.

Referring to FIG. 16B, for example, when the temperature measured by the temperature sensor 300-1 is approximately 36° C., the temperature measured by the temperature sensor 300-2 is approximately 39° C., and the temperature measured by the temperature sensor 300-3 is approximately 38° C., the processor 500 may estimate the temperatures of the points P1, P2, and P3 as averages of the temperatures measured by the respective temperature sensors 300-1 to 300-3. That is, the processor 500 can estimate the temperature at the point P1 as approximately 37.5° C., the temperature at the point P2 as approximately 38.5° C., and the temperature at the point P3 as approximately 37° C. In addition, the processor 500 can estimate the temperatures of the points P1-1, P1-2, P2-1, P2-2, P3-1, and P3-2 as averages of the temperatures measured at the points P1, P2, and P3 and the temperatures measured by the temperature sensors 300-1 to 300-3. That is, the processor 500 can estimate the temperature at the point P1-1 as approximately 36.75° C., the temperature at the point P1-2 as approximately 38.25° C., the temperature at the point P2-1 as approximately 38.75° C., the temperature at the point P3-1 as approximately 37.5° C., and the temperature at the point P3-2 as approximately 36.5° C.

In the examples of FIGS. 16A and 16B, the processor 500 estimates the temperatures at the points where the temperature sensors 300-1 to 300-3 are not attached using the averages but is not limited thereto. It will be appreciated by a person of ordinary skill in the art that the temperatures can be estimated by using other representative values such as median and mode, or by using a weighted average with different weights depending on the positions where the temperature sensors are attached or the distances between the respective temperature sensors.

Figure 17:
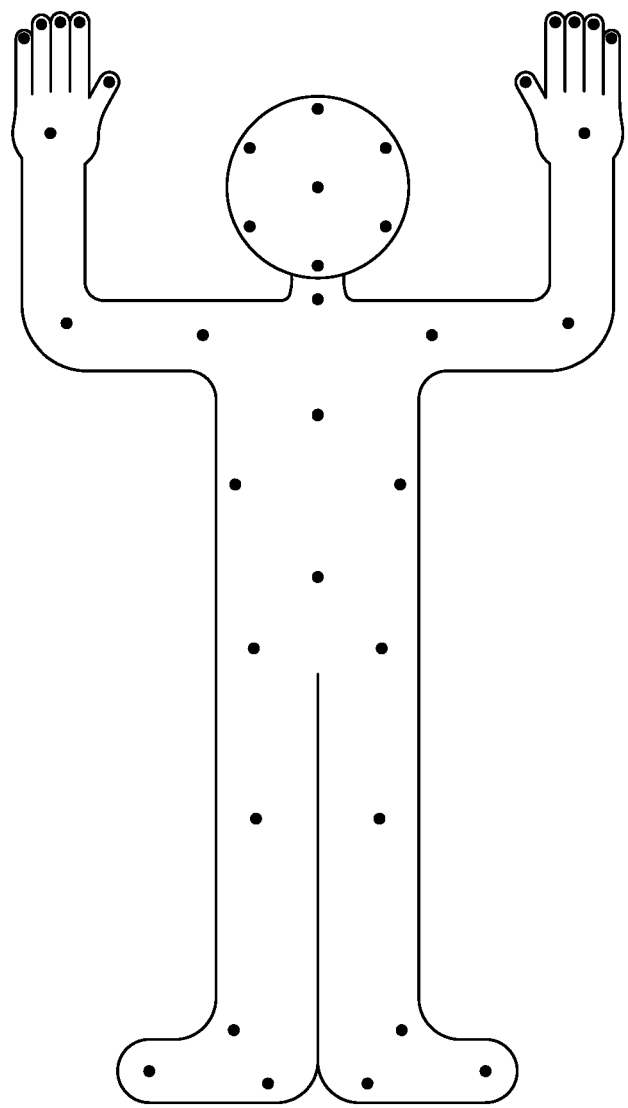
FIG. 17 a diagram schematically illustrating a structure of a temperature transfer garment according to another embodiment of the present disclosure.

FIG. 17 a diagram schematically illustrating a structure of a temperature transfer garment according to another embodiment of the present disclosure. The temperature transfer garment can be used with the temperature transfer headphone or temperature transfer HMD described above.

Referring to FIG. 17, the temperature sensor 300 can be attached to a region of the temperature transfer garment corresponding to a particular part (e.g., each joint) of the body of the user so as to measure the temperature of the particular part. In this case, the temperature sensor 300 can be attached to the rear as well as the front of the user.

The temperature at a region at which the temperature sensor 300 is not attached may be estimated by the processor 500, as described with reference to FIGS. 16A and 16B. In the case of a face, it may be estimated by predicting a 3D matrix distribution of temperature based on the temperature measured at the point where the temperature sensor 300 is attached.

Meanwhile, the temperature transfer garment can be implemented so that both temperature measurement and temperature reproduction can be achieved by using a dual material capable of sensing temperature and haptic output of the entire region.

The disclosed technology can have the following effects. However, since it does not mean that a specific embodiment should include all of the following effects or only the following effects, it should not be understood that the scope of rights of the disclosed technology is limited to the specific embodiment.

According to the extended reality system based on multimodal interfaces according to the embodiments of the present disclosure described above, the user can experience reproduction of five senses with a sense of reality without interruption.

According to the wearable temperature transfer device according to the embodiments of the present disclosure described above, content can be provided so that a user can feel a sense of reality and immersion, and wearability can be improved.

Although description has been made as above with reference to the drawings and examples, it does not mean that the scope of protection of the present disclosure is limited by the drawings or examples, and a person skilled in the art will appreciate that various modifications and changes can be made to the present disclosure without departing from the spirit and scope of the present disclosure described in the following claims.

Although the extended reality system based on multimodal interfaces has been described with reference to the specific embodiments, it is not limited thereto. Therefore, it will be readily understood by those skilled in the art that various modifications and changes can be made thereto without departing from the spirit and scope of the present disclosure defined by the appended claims.

What is claimed:

1. An extended reality (XR) system based on multimodal interfaces comprising:
    a computer configured to transmit output data in a natural user interface/experience (NUI/NUX) format for XR machine (NFXM) format having a mirror structure, wherein the output data includes:
        at least one device identifier (ID),
        at least one time limit,
        at least one reproduction data to at least one extended reality output device, and
        a command flag that indicates whether or not to reproduce the reproduction data; and
    at least one extended reality output device configured to receive the output data and reproduce only reproduction data corresponding to itself within the time limit based on the at least one device identifier (ID) and the command flag.

2. The extended reality (XR) system of claim 1, wherein the computer broadcasts the output data to the at least one extended reality output device.

3. The extended reality (XR) system of claim 1, wherein the at least one extended reality output device does not reproduce the reproduction data corresponding to itself when the time limit has elapsed.

4. The extended reality (XR) system of claim 1, wherein the NFXM format includes a command, a device count, a device ID, a packet size, and a packet.

5. The extended reality (XR) system of claim 1, wherein the computer broadcasts the output data by selectively encrypting an entire area or a partial area of the NFXM format.

6. The extended reality (XR) system of claim 1, wherein the computer encrypts an entire area and a partial area of the NFXM format, and accesses the encrypted entire area and the encrypted partial area using different keys.

7. The extended reality (XR) system of claim 1, wherein the reproduction data includes at least one reproduction data of sight, hearing, touch, smell, and taste.

8. The extended reality (XR) system of claim 1, wherein the extended reality output device is any one of a head mounted display (HMD), a headphone, and a haptic device.

9. The extended reality (XR) system of claim 1, wherein the computer synchronously transmits the output data based on at least one of the reproduction data and the command flag.

10. An extended reality (XR) system based on multimodal interfaces comprising:
   a computer configured to transmit output data in a natural user interface/experience (NUI/NUX) format for XR machine (NFXM) format having a mirror structure, wherein the output data includes:
      at least one device identifier (ID),
      at least one time limit,
      at least one reproduction data to at least one extended reality output device, and
      a command flag that indicates whether or not to reproduce the reproduction data; and
   at least one extended reality output device configured to receive the output data and reproduces only reproduction data corresponding to itself within the time limit based on the at least one device identifier (ID) and the command flag, wherein the computer is located inside any one of the at least one extended reality output device.

11. A method for implementing a multimodal interfaces in an extended reality (XR) system, the method comprising:
   synchronizing an operation time between a computer and at least one extended reality output device; and
   transmitting, by the computer, output data in a natural user interface/experience (NUI/NUX) format for XR machine (NFXM) format having a mirror structure, wherein the output data includes:
      at least one device identifier (ID),
      at least one time limit,
      at least one reproduction data to at least one extended reality output device, and
      a command flag that indicates whether or not to reproduce the reproduction data,
   wherein the at least one extended reality output device is configured to receive the output data and reproduce only reproduction data corresponding to itself within the time limit based on the at least one device identifier (ID) and reproduce the reproduction data corresponding to itself within the time limit based on the command flag.

12. A method of receiving, by at least one extended reality (XR) output device, reproduction data from a computer, comprising:
   synchronizing an operation time between the computer and the at least one extended reality (XR) output device;
   receiving, from the computer, output data in a natural user interface/experience (NUI/NUX) format for XR machine (NFXM) format having a mirror structure, wherein the output data includes:
      at least one device identifier (ID),
      at least one time limit,
      at least one reproduction data, and
      a command flag that indicates whether or not to reproduce the reproduction data; and
   reproducing the reproduction data corresponding to itself within the time limit based on the at least one device identifier (ID) and the command flag.

13. A wearable temperature transfer device comprising:
   a content output device configured to deliver content to a user;
   a wearing means configured to allow the user to wear the wearable temperature transfer device;
   at least one temperature sensor configured to measure an ambient temperature that includes an external temperature of the wearable temperature transfer device and a body temperature of the user, wherein the external temperature includes at least one of an air temperature or a room temperature;
   at least one thermoelectric element configured to transfer thermal energy with the user; and
   a processor that is communicatively coupled to the at least one temperature sensor and the at least one thermoelectric element, wherein the processor is configured to:
      determine a temperature based on the ambient temperature and a temperature preset by the user, and
      control thermoelectric element to produce the temperature determined.

14. The wearable temperature transfer device of claim 13, wherein the at least one temperature sensor is attached to an inner surface and an outer surface of the wearable temperature transfer device to measure the ambient temperature, the inner surface being a surface that contacts the user when the user wears the wearable temperature transfer device, and the outer surface being a surface that does not contact the user when the user wears the wearable temperature transfer device.

15. The wearable temperature transfer device of claim 14, wherein the processor estimates a temperature of a portion of the inner surface and the outer surface to which the at least one temperature sensor is not attached using the temperature measured by the at least one temperature sensor.

16. The wearable temperature transfer device of claim 13, wherein the at least one thermoelectric element heats the user by an exothermic reaction or cools the user by an endothermic reaction.

17. The wearable temperature transfer device of claim 13, wherein, when the content is audio, the processor further determines the temperature based on at least one of a frequency, a tempo, or a beat of the audio.

18. The wearable temperature transfer device of claim 13, wherein, when the content is an extended reality simulation, the processor further determines the temperature based on a relative position of an object included in the extended reality simulation and the user.

* * * * *